United States Patent
Blei et al.

(10) Patent No.: US 11,549,453 B2
(45) Date of Patent: Jan. 10, 2023

(54) HEATING OF AN EXHAUST GAS RECIRCULATION LINE DURING AN OVERRUN MODE OF A COMBUSTION UNIT

(71) Applicant: Volkswagen Aktiengesellschaft, Wolfsburg (DE)

(72) Inventors: Ingo Blei, Braunschweig (DE); Johannes Bunkus, Hoetensleben OT Barneberg (DE); Stephan Kraus, Gross Twuelpstedt (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 17/699,959

(22) Filed: Mar. 21, 2022

(65) Prior Publication Data

US 2022/0298991 A1 Sep. 22, 2022

(30) Foreign Application Priority Data

Mar. 22, 2021 (DE) ..................... 10 2021 107 008.2

(51) Int. Cl.
| | |
|---|---|
| *F02D 41/00* | (2006.01) |
| *F01N 3/20* | (2006.01) |
| *F02M 26/06* | (2016.01) |
| *F02M 26/25* | (2016.01) |
| *F02M 26/15* | (2016.01) |
| *F01P 7/14* | (2006.01) |

(Continued)

(52) U.S. Cl.
CPC ....... *F02D 41/0055* (2013.01); *F01N 3/2013* (2013.01); *F01P 7/14* (2013.01); *F02M 26/06* (2016.02); *F02M 26/15* (2016.02); *F02M 26/35* (2016.02); *F01N 2240/16* (2013.01); *F02M 26/25* (2016.02); *F02M 26/28* (2016.02)

(58) Field of Classification Search
CPC ........ F02M 26/15; F02M 26/25; F02M 26/28; F01N 3/2013; F01P 7/14
See application file for complete search history.

(56) References Cited

U.S. PATENT DOCUMENTS

| | | |
|---|---|---|
| 8,919,100 B2 | 12/2014 | Verbrugge et al. |
| 2013/0269663 A1 | 10/2013 | Nishiyama et al. |
| 2020/0284176 A1* | 9/2020 | Kemmerling ............. F01N 9/00 |

FOREIGN PATENT DOCUMENTS

| | | |
|---|---|---|
| AT | 520414 A1 | 3/2019 |
| AT | 521758 A1 | 4/2020 |
| DE | 102012209202 A1 | 12/2012 |

(Continued)

*Primary Examiner* — Ngoc T Nguyen
(74) *Attorney, Agent, or Firm* — Muncy, Geissler, Olds & Lowe, P.C.

(57) ABSTRACT

A method for operating an internal combustion engine, which comprises a combustion unit, a generator coupled with the combustion unit, a fresh gas tract, an exhaust tract, an exhaust gas recirculation line, which branches off of the exhaust tract and opens into the fresh gas tract, and at least one electrical heating device, which is integrated into the exhaust tract or into the exhaust gas recirculation line, characterized in that, during an overrun mode of the combustion unit, the heating device is operated with energy provided by the generator, and exhaust gas heated with the aid of the heating device is partially or completely guided via the exhaust gas recirculation line.

11 Claims, 3 Drawing Sheets

(51) Int. Cl.
*F02M 26/35* (2016.01)
*F02M 26/28* (2016.01)

(56) References Cited

FOREIGN PATENT DOCUMENTS

| | | |
|---|---|---|
| DE | 112011104505 T5 | 12/2013 |
| DE | 102016201185 A1 | 7/2017 |
| DE | 102019135831 A1 | 8/2020 |
| DE | 102019135832 A1 | 8/2020 |
| DE | 102019113736 A1 | 11/2020 |
| DE | 10201913182983 | 1/2021 |
| EP | 2336538 A1 | 6/2011 |
| FR | 3109802 A1 * | 11/2021 |
| JP | 201048107 A | 3/2010 |

* cited by examiner

HEATING OF AN EXHAUST GAS RECIRCULATION LINE DURING AN OVERRUN MODE OF A COMBUSTION UNIT

This nonprovisional application claims priority under 35 U.S.C. § 119(a) to German Patent Application No. 10 2021 107 008.2, which was filed in Germany on Mar. 22, 2022, and which is herein incorporated by reference.

BACKGROUND OF THE INVENTION

Field of the Invention

The present invention relates to a method for operating an internal combustion engine, which comprises a combustion unit, a generator coupled with the combustion unit, a fresh gas tract, an exhaust tract, an exhaust gas recirculation line, which branches off of the exhaust tract and opens into the fresh gas tract, and at least one electrical heating device, which is integrated into the exhaust tract or into the exhaust gas recirculation line.

Description of the Background Art

In operating an internal combustion engine, an exhaust gas recirculation line may be provided to keep the harmful raw emissions of the combustion unit of the internal combustion engine as low as possible, in particular with regard to the nitrogen oxide emissions. Exhaust gas is diverted from an exhaust tract of the internal combustion engine and introduced into the fresh gas tract of the internal combustion engine, where it is mixed with air. This air/gas mixture is then supplied to the combustion unit as fresh gas for a combustion with fuel. High-pressure as well as low-pressure exhaust gas recirculation systems are known, in the case of a low-pressure exhaust gas recirculation system the exhaust gas being diverted from the exhaust tract downstream from an exhaust gas turbine of an exhaust gas turbocharger and introduced into the exhaust tract upstream from a fresh gas compressor of the exhaust gas turbocharger. In the case of a high-pressure exhaust gas recirculation system, however, if an exhaust gas turbocharger is provided, the diversion takes place upstream from the exhaust gas turbine and the introduction takes place downstream from the fresh gas compressor. For a control of the quantity of the recirculated exhaust gas, a so-called EGR valve is integrated into an exhaust gas recirculation line provided for transferring exhaust gas from the exhaust tract to the fresh gas tract. An exhaust gas cooler for cooling the exhaust gas guided via the exhaust gas recirculation line as needed is furthermore provided in an exhaust gas recirculation line of this type. This is intended to avoid negative effects of an excessively high temperature of the fresh gas on the combustion processes in the combustion unit as well as, in the case of a low-pressure exhaust gas recirculation, a thermal overloading of the fresh gas compressor.

A cooling of exhaust gas with the aid of an exhaust gas cooler may take place either directly or indirectly using ambient air, in the case of an indirect cooling a transfer of thermal energy from the exhaust gas to a liquid coolant taking place in the exhaust gas cooler, which may then be recooled in a coolant cooler. The advantage of an indirectly cooling exhaust gas cooler of this type lies in the implementation of a relatively high cooling power with a relatively small installation space.

After a cold start of an internal combustion engine, i.e. after a startup at a relatively low temperature, in particular, essentially corresponding to the ambient temperature, of the internal combustion engine or of the associated component, an exhaust gas recirculation may usually not be implemented directly, because a condensation of moisture in the exhaust gas recirculation line may occur to a considerable degree, due to the exhaust gas generated by the combustion unit, which is still relatively cold at that point. This condensate may result in a damage to components integrated into the exhaust gas recirculation line and/or the fresh gas tract.

To keep the harmful and, in particular, nitrogen oxide raw emissions of an internal combustion engine as low as possible after a cold start, the fastest possible activation of an exhaust gas recirculation would be advantageous.

AT 520 414 A1 discloses a method for operating an internal combustion engine, which includes an exhaust gas aftertreatment apparatus and a heating device, the heating device being configured to preheat at least one component of the exhaust gas aftertreatment apparatus in an unfired internal combustion engine. For this purpose, the heating device comprises a heating element and a conveying device for generating a heated gas flow, which flows through the exhaust gas aftertreatment apparatus. This heated gas flow may be also guided via an exhaust gas recirculation line for forming a circuit.

DE 10 2012 209 202 A1, which corresponds to US 2012/0304622, describes a method for operating a hybrid or electric vehicle, electrical energy, which was generated as a result of an actuation of a regenerative braking system, is guided directly, i.e. circumventing a battery, to an electrical ancillary unit of the hybrid or electric vehicle. The electrical ancillary unit may be an electrically heated catalyst.

AT 521 758 A1 discloses a method, according to which a gasoline engine is operated in an operating phase, which comprises a normal or load operating phase and an overrun phase. In the normal operating phase, fuel and air are converted into exhaust gas in the gasoline engine. The overrun phase may be an unfired overrun phase and/or a fired overrun phase, the gas flowing through a main catalyst in the fired overrun phase being low in oxygen. In the unfired overrun phase, the exhaust gas generated in the gasoline engine prior to or during the transition from the normal operating phase or a fired overrun phase into the unfired overrun phase is supplied to the gasoline engine via an exhaust gas recirculation line.

EP 2 336 538 A1 describes an internal combustion engine, which includes an exhaust gas recirculation line, into which an exhaust gas cooler is integrated. A controllable branch is provided in the exhaust gas recirculation line downstream from the exhaust gas cooler, with the aid of which the exhaust gas coming from the exhaust gas cooler may be guided, on the one hand, onward via the exhaust gas recirculation line and thus into a fresh gas tract of the internal combustion engine and, on the other hand, back to the exhaust tract. This makes it possible to guide the entire exhaust gas of the internal combustion engine via the exhaust gas cooler as needed, even if only a portion thereof is to be used for an exhaust gas recirculation. In particular after a cold start of the internal combustion engine, thermal energy of the exhaust gas may be transferred thereby as completely as possible to a coolant flowing through the exhaust gas cooler for the purpose of preheating the latter.

SUMMARY OF THE INVENTION

It is therefore an object of the present invention to provide a possibility for being able to activate an exhaust gas recirculation as quickly as possible after a cold start of an internal combustion engine.

A method according to the invention for operating an internal combustion engine, which comprises a combustion unit, a generator coupled with the combustion unit, a fresh gas tract, an exhaust tract, an exhaust gas recirculation line, which branches off of the exhaust tract and opens into the fresh gas tract, and at least one electrical heating device, which is integrated into the exhaust tract or into the exhaust gas recirculation line, is characterized in that, during an overrun mode of the combustion unit, in which the latter provides a negative driving power or a braking power, no fuel being preferably introduced into the combustion chambers for this purpose, the heating device is operated with energy provided by the generator, and exhaust gas heated with the aid of the heating device (which may be essentially or exclusively made up of air, due to the overrun mode), is partially or completely guided via the exhaust gas recirculation line.

The overrun mode may result, in particular, from the fact that a moving vehicle, for whose driving the internal combustion engine is generally provided, drives the combustion unit using its kinetic energy, in that the section of the drive train of the motor vehicle situated between the combustion unit and the driven wheels of the motor vehicle is not interrupted or the clutch engaged. The, in particular, unfired combustion unit is then dragged by the moving motor vehicle, the latter and the components coupled therewith, in particular the generator, generating the negative driving power or the braking power. An overrun mode of an internal combustion engine is usually present when the motor vehicle is to be decelerated, in particular when coasting prior to an expected stop, for example at a traffic light, or when the motor vehicle drives down a slope and is not to be accelerated. Such an overrun mode of an internal combustion engine is therefore usually at least temporarily associated with a braking mode of the motor vehicle, in which the latter is braked by a use of a service brake. During an overrun mode of an internal combustion engine, kinetic energy of the motor vehicle is therefore often intentionally reduced, the reduced portion of the energy usually being lost unused.

Due to the procedure according to the invention, the reduction of kinetic energy of the motor vehicle or another system dragging the combustion unit may be advantageously used to operate the heating device. On the one hand, this has the advantage that the electrical energy necessary for operating the heating device does not have to be generated by a conversion of fuel by means of an operation of the combustion unit under load, in which the latter provides a positive driving power. On the other hand, the exhaust gas, which has a usually only very low exhaust gas temperature, in particular during an unfired overrun mode of the combustion unit, is heated with the aid of the heating device, so that the exhaust tract (up to the branch of the exhaust gas recirculation line) and the exhaust gas recirculation line are actively heated, despite the overrun mode of the internal combustion engine. Conversely, a conventional overrun mode would tend to effectuate a cooling of the exhaust tract and the exhaust gas recirculation line, due to the very low exhaust gas temperature.

Carrying out a method according to the invention may be advantageous, in particular during a warm-up phase of the internal combustion engine, which is present when at least one component of the internal combustion engine, for example the combustion unit, has an operating temperature, which is below a defined minimum temperature, since, during a warm-up phase of this type, the problem described above occurs, according to which the exhaust gas recirculation line and the components integrated therein may be so cold that, due to the risk of condensation, no exhaust gas recirculation may be carried out or no exhaust gas may be guided via the exhaust gas recirculation line. Such a risk of condensation essentially does not exist when carrying out the method according to the invention, due to the heating of the exhaust gas with the aid of the heating device. At the same time, the guidance of the heated exhaust gas via the exhaust gas recirculation line effectuates the fastest possible heating of the exhaust gas recirculation line, including the components integrated therein, whereby the risk of a condensate formation, which is present, in particular, on cold surfaces, is reduced. Accordingly, it may be sensible to implement the heating device during an overrun mode of the combustion unit at least also or only during a warm-up phase of the internal combustion engine. Due to the heating of the exhaust gas recirculation line, an exhaust gas recirculation may be carried out as quickly as possible after a cold start of the internal combustion engine.

A warm-up phase may begin, in particular, with a cold start of the internal combustion engine. However, a phase of this type may also occur if the combustion unit was operated for a longer period of time at only low load or even in overrun mode, for example, due to a longer-lasting downhill travel of a motor vehicle comprising the internal combustion engine.

The heating device may preferably be assigned to an exhaust gas aftertreatment apparatus integrated into the exhaust tract, the exhaust gas recirculation line branching off of the exhaust tract downstream from the exhaust gas aftertreatment apparatus. As a result, the heating device may also be used to heat the exhaust gas aftertreatment apparatus as needed, which, in turn, may be advantageous, in particular during the warm-up phase of the internal combustion engine, to reach the light-off temperature of the exhaust gas aftertreatment apparatus as quickly as possible after a cold start, from which point on a sufficient effectiveness may be assumed for the exhaust gas aftertreatment. In addition, the exhaust gas aftertreatment apparatus may be kept sufficiently warm with the aid of the heating device during a longer-lasting operation of the combustion unit at low load or in overrun mode. A heating of the exhaust gas aftertreatment apparatus may also be provided to temporarily reach a relatively high temperature for a regeneration. Due to such a dual use of a heating device, it is possible to avoid having to provide a separate heating device, which is used exclusively for heating the exhaust gas recirculation line within the scope of a method according to the invention.

An exhaust gas cooler or a first heat exchange side thereof may preferably be integrated into the exhaust gas recirculation line to cool the exhaust gas guided via the exhaust gas recirculation line, in particular during a normal operation of the internal combustion engine (i.e., not during a warm-up mode). A thermal overload of a section of the fresh gas tract extending into the exhaust gas recirculation line and starting at the opening of the exhaust gas recirculation line may be avoided thereby, in particular a thermal overload of a fresh gas compressor integrated into this section of the fresh gas tract. However, an exhaust gas cooler of this type may work against the goal aimed for according to the invention of heating the exhaust gas recirculation line and integrating the still relatively warm exhaust gas into the fresh gas tract during a warm-up phase of the internal combustion engine. Within the scope of a method according to the invention, it is therefore preferably provided that, during the overrun mode, the exhaust gas to be guided via the exhaust gas recirculation line is guided via an exhaust gas bypass of the exhaust gas recirculation line (bypassing the exhaust gas cooler), and/or a coolant flow through the exhaust gas cooler or through a second heat exchange side thereof is reduced or (completely) prevented in comparison to a(n) (in particular each) operation under load. Consequently, an unwanted cooling of the exhaust gas guided via the exhaust gas recirculation line with the aid of the exhaust gas cooler may be avoided or at least kept low thereby. To reduce or prevent the coolant flow through the exhaust gas cooler, the latter may, in principle, be correspondingly throttled. However, it may be advantageously provided to partially or completely guide the coolant flow via a coolant bypass of a cooling system of the internal combustion engine (bypassing the exhaust gas cooler). This makes it possible to avoid also reducing a cooling power for other components of the cooling system, which are integrated into one or multiple cooling circuits, which also comprise the exhaust gas cooler, by reducing or preventing the coolant flow through the exhaust gas cooler.

To make the greatest possible use of the kinetic energy which may be used within the scope of a method according to the invention, due to the overrun mode of the combustion unit, for operating the heating device by means of conversion with the aid of the generator, it may be preferably provided that the generator is operated or loaded with maximum electrical power during the overrun mode.

Within the scope of a method according to the invention, it may possibly be sensible to additionally operate the heating device with energy derived from an energy storage source, for example a battery. In particular, it may be provided that the heating device is additionally operated with energy from the energy storage source only if a setpoint heating power of the heating device is greater than an actual electrical power of the generator. In other words, it may be provided that the energy storage source is used to operate the heating device only if the overrun mode of the internal combustion engine is so weak that the electrical power which may be generated with the aid of the generator is less than the heating power provided for heating the exhaust gas with the aid of the heating device.

The branch of the exhaust gas recirculation line and/or, if provided, the exhaust gas aftertreatment apparatus, may be arranged downstream from an exhaust gas turbine (of an exhaust gas turbocharger) integrated into the exhaust tract, because the problem of an only relatively slow heating of the exhaust gas recirculation line and/or the exhaust gas aftertreatment apparatus arises to a particular degree in such a design of an internal combustion engine, because relatively cold exhaust gas is present downstream from the exhaust gas turbine. This is attributed not only to an already completed transfer of thermal energy to the exhaust gas turbine, but rather, in particular, also to the functional relaxation of the exhaust gas via the exhaust gas turbine.

The exhaust gas aftertreatment apparatus of an internal combustion engine operated according to the invention may comprise, in particular, one or multiple of the following exhaust gas aftertreatment components: oxidation catalyst, NOx storage catalyst, SCR catalyst (SCR: selective catalytic reduction of nitrogen oxides), particle filter.

It may furthermore be preferably provided that the combustion unit is operated in an auto-igniting and preferably a quantity-controlled manner within the scope of a method according to the invention. The combustion unit may therefore be designed, in particular, in the form of a diesel engine, because a diesel engine of this type generates, in principle, relatively cold exhaust gas, and consequently a sufficient heating of the exhaust tract as well as an exhaust gas recirculation line is achieved only relatively slowly, in particular after a cold start of a diesel engine of this type. In addition, the harmful emissions, in particular of a diesel engine, may be advantageously influenced with the aid of an exhaust gas recirculation system. However, it is also possible that the combustion unit is operated in an externally ignited and, in particular, also quantity-controlled manner within the scope of a method according to the invention and is therefore designed as a gasoline engine. A combination of auto-igniting and externally ignited operation is also possible, for example, in a design as a combustion unit having homogeneous compression ignition. Within the scope of a method according to the invention, the combustion unit may be operated with liquid fuel (i.e., diesel or gasoline) or with a gaseous fuel (in particular, natural gas, LNG or LPG).

A branch may preferably be integrated into the exhaust gas recirculation line for designing an internal combustion engine as described in EP 2 336 538 A1, which is incorporated herein by reference.

The invention also relates to a method for operating a motor vehicle in the manner described above. The motor vehicle may be, in particular, a wheel-based and not a railbound motor vehicle (preferably a passenger car or a truck).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
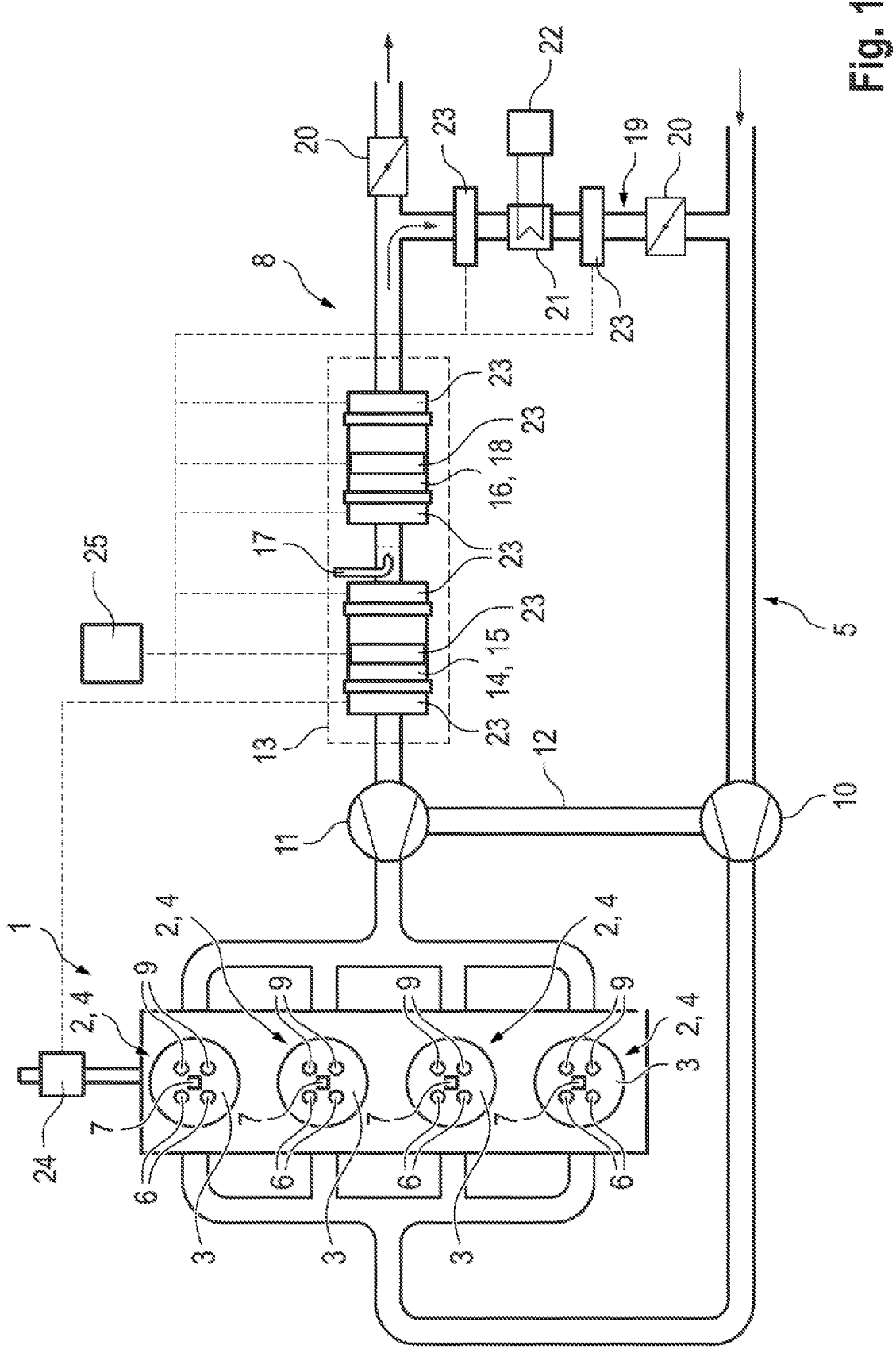
FIG. 1 shows an internal combustion engine suitable for carrying out a method according to the invention according to an exemplary embodiment.

The internal combustion engine illustrated in FIG. 1 comprises a combustion unit 1, which is designed, for example, in the form of a reciprocating engine, including four cylinder openings 2 arranged in series. Cylinder openings 2 each limit a combustion chamber 4 with the aid of reciprocating pistons 3 guided therein and a cylinder head. During the operation of combustion unit 1, and thus the internal combustion engine, fresh gas is supplied to these combustion chambers 4 via a fresh gas tract 5, the supply of the fresh gas being controlled with the aid of inlet valves 6, which are assigned to the individual combustion chambers 4. The fresh gas is exclusively or primarily air, which is sucked in from the surroundings. Exhaust gas is generated during the combustion of mixture quantities, which are made up of the fresh gas as well as fuel injected directly into combustion chambers 4 via fuel injectors 7. This exhaust gas is guided out of the internal combustion engine via an exhaust tract 8, the removal of the exhaust gas from the individual combustion chambers 4 being controlled with the aid of outlet valves 9.

The internal combustion engine is provided with a charged design, for which purpose, a fresh gas compressor 10 is integrated into fresh gas tract 5. Fresh gas compressor 10 is part of an exhaust gas turbocharger, which further comprises an exhaust gas turbine 11, which is integrated into exhaust tract 8. Exhaust gas which flows through exhaust gas turbine 11 results in a rotating driving of a turbine rotor, which is connected to a compressor rotor of fresh gas compressor 10 in a rotationally driving manner via a shaft 12, so that a driving of fresh gas compressor 10 with the aid of exhaust gas turbine 11 takes place as a result.

Exhaust gas turbine 11 is arranged in exhaust tract 8 upstream from an exhaust gas aftertreatment apparatus 13 (with regard to the flow direction of the exhaust gas). Exhaust gas aftertreatment apparatus 13 is provided to remove components of the exhaust gas which represent harmful substances from the exhaust gas or to convert them into harmless components.

In the exemplary embodiment according to FIG. 1, exhaust gas aftertreatment apparatus 13 comprises multiple exhaust gas aftertreatment components: Specifically, an oxidation catalyst 14, an NOx storage catalyst 15, an SCR catalyst 16, which includes an upstream injection device 17 for a reduction agent (NH$_3$), as well as a particle filter (18) are provided. Oxidation catalyst 14 as well as NOx storage catalyst 15 are provided with in integral design, i.e. in the form of a first exhaust gas aftertreatment component, which effectuates both exhaust gas aftertreatment functions. The same applies to SCR catalyst 16 and particle filter 18 in the form of an integral second exhaust gas aftertreatment component.

The internal combustion engine further comprises an exhaust gas recirculation line 19, which branches off of exhaust tract 8 downstream from exhaust gas aftertreatment apparatus 13 and which opens into fresh gas tract 5 upstream from fresh gas compressor 10. With the aid of exhaust gas recirculation line 19, a portion of or also the entire exhaust gas at the opening and arriving therefrom may be introduced into fresh gas tract 5, mixed with air and, after a compression, supplied (again) to combustion chambers 4 of combustion unit 1 with the aid of fresh gas compressor 10. A control or setting of the portion (0% to 100%) of the exhaust gas to be guided via exhaust gas recirculation line 19 may be implemented with the aid of two control valves 20, one of which is integrated into exhaust gas recirculation line 19 (so-called "exhaust gas recirculation valve"), and the other is integrated into exhaust tract 8 downstream from the branch of exhaust gas recirculation line 19 (so-called "exhaust gas valve").

An exhaust gas cooler 21 or a first heat exchange side thereof is furthermore integrated into exhaust gas recirculation line 19. A second heat exchange side of exhaust gas cooler 21 is integrated into a cooling system 22 of the internal combustion engine, in which a liquid coolant may be transported in multiple cooling circuits to effectuate a cooling of those components of the internal combustion engine, for which a cooling of this type is necessary.

One or multiple electrical heating device(s) 23 is/are integrated into the exhaust tract 8 (or into the section thereof, which is situated upstream from exhaust gas recirculation line 19) and/or into exhaust gas recirculation line 19. FIG. 1 shows a multiplicity of possibilities with regard to the arrangement of these heating devices 23. If present, heating device(s) 23 integrated into exhaust tract 8 is/are preferably assigned to at least one of the (combined) exhaust gas aftertreatment components, so that the corresponding exhaust gas aftertreatment component(s) may be heated as needed with the aid of heating device(s) 23. A transfer of the thermal energy may take place by means of radiation and/or convection. Heating device(s) 23 assigned to the exhaust gas aftertreatment component(s) may be arranged, for example, directly upstream therefrom or be integrated thereinto according to FIG. 1. An arrangement of heating devices 23 directly downstream from the exhaust gas aftertreatment components is also possible according to FIG. 1. In the case of an integration of one or multiple heating device(s) 23 into exhaust gas recirculation line 19, they may be arranged, for example directly upstream from exhaust gas cooler 21 and/or directly downstream therefrom according to FIG. 1.

The energy necessary for an operation of heating device(s) 23 may be provided with the aid of a generator 24, which is driven directly by combustion unit 1 or by an output shaft (crankshaft) 13 of combustion unit 1. Additionally or alternatively, the energy necessary for an operation of heating device(s) 23 may also be provided with the aid of an energy storage source 25 in the form of a battery.

Within the scope of the method according to the invention for operating an internal combustion engine, it is provided according to FIG. 1 to (also) use heating device(s) 23 to heat the exhaust gas output by combustion unit 1 during the overrun mode thereof, this heated exhaust gas being partially or completely guided via exhaust gas recirculation line 19 for the purpose of heating the latter. This takes place, in particular, during a warm-up phase after a cold start of the internal combustion engine to heat exhaust gas recirculation line 19 and the components integrated thereinto as well as fresh gas compressor 14 integrated into fresh gas tract 5 to the extent that the risk of a condensation of moisture from the exhaust gas guided via exhaust gas recirculation line 19 no longer exists even if the exhaust gas is no longer heated with the aid of heating device(s) 23. An exhaust gas recirculation during an operation of the combustion unit under load is to be implemented thereby as quickly as possible after a cold start of the internal combustion engine, which has an advantageous effect with respect to the harmful emissions and, in particular, nitrogen oxide raw emissions of combustion unit 1.

Figure 3:
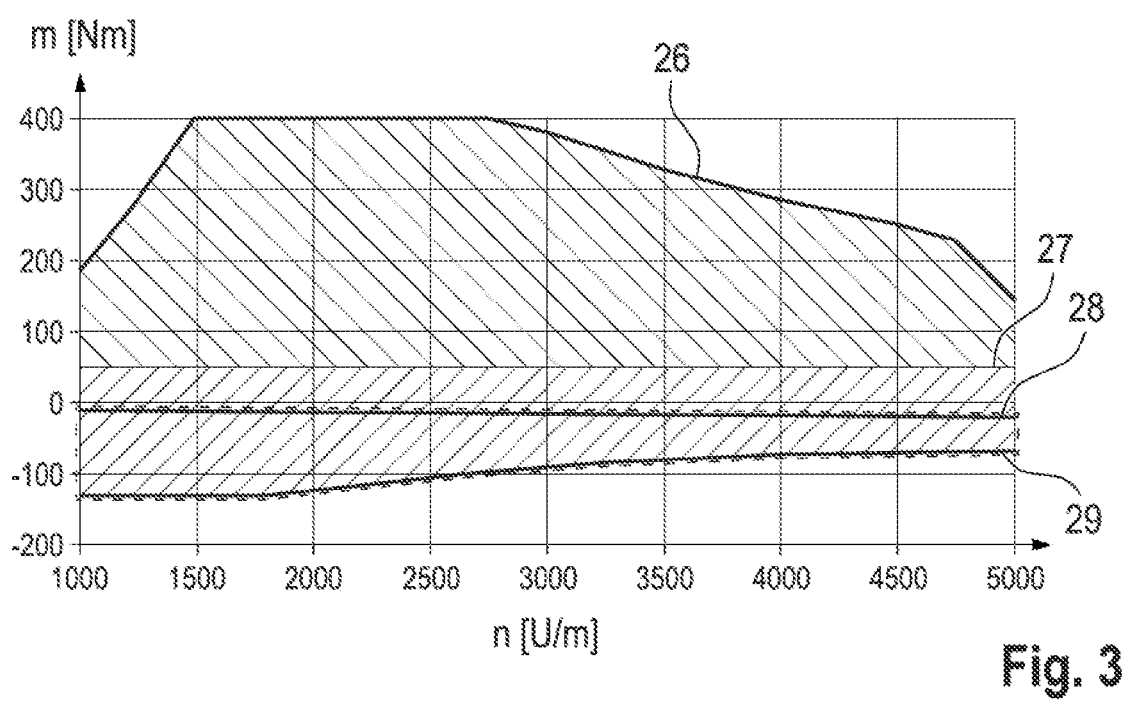
FIG. 3 shows an operating characteristic map of an internal combustion engine operated according to the invention.

FIG. 3 shows the operating range of combustion unit 1, in which the method according to the invention is carried out. An operating characteristic map, in which the profile of the torque (m) generated or taken up by combustion unit 1 is shown over the operating speed (n). Curve 26 shows the profile of the maximum torque which may be generated by combustion unit 1. (Constantly progressing) curve 27, however, shows the boundary line related to the torque with regard to the gradient of the temperature of exhaust gas aftertreatment apparatus 13. A positive temperature gradient is given during an operation of combustion unit 1 at operating points above this curve 27, so that an increase in the temperature of exhaust gas aftertreatment apparatus 13 is effectuated by the exhaust gas generated by combustion unit 1 during the warm-up phase. However, a negative temperature gradient is present during an operation of combustion unit 1 below this curve 27, so that a cooling of exhaust gas aftertreatment apparatus 13 would usually take place during the warm-up phase. (Constantly progressing) curve 28 in FIG. 3 furthermore shows the braking torque effectuated by combustion unit 1 during the unfired overrun mode, and curve 29 shows the profile of a maximum recuperation torque which may be effectuated with the aid of the internal combustion engine, which is made up of the braking torque of combustion unit 1 which is in an unfired overrun mode, as well as the resistance torque, which may be additionally effectuated with the aid of generator 24. The range of the operating characteristic map below curve 28 is the one in which the electrical energy necessary for an operation of heating device(s) 23 may be advantageously generated with the aid of generator 24.

One purpose of the method according to the invention is to heat exhaust gas output with the aid of heating device(s) 23 during an overrun mode of by combustion unit 1 and to guide it via exhaust gas recirculation line 19 for the purpose of heating the latter as quickly as possible after a cold start of the internal combustion engine until a sufficiently high temperature is reached. Exhaust gas cooler 21 integrated into exhaust gas recirculation line 19 may counteract this purpose if it simultaneously effectuates a cooling effect, due to a transfer of thermal energy from the exhaust gas to the coolant of cooling system 22. It is therefore provided according to the invention to partially or completely deactivate exhaust gas cooler 21 during this measure, in that, in the internal combustion engine according to FIG. 1, a mass flow of coolant of the cooling system guided through exhaust gas cooler 21 is reduced (possibly to zero).

Figure 2:
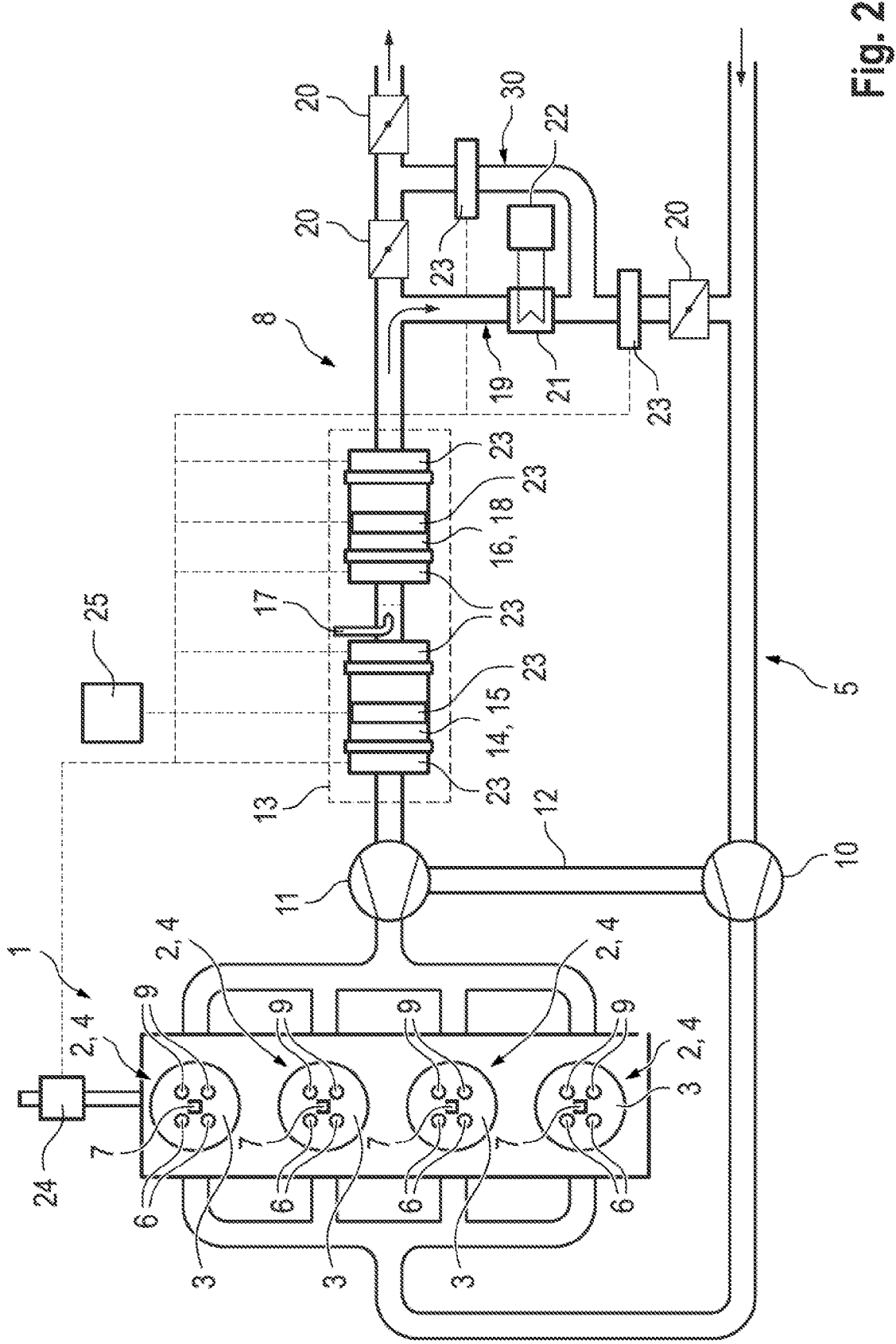
FIG. 2 shows an internal combustion engine suitable for carrying out a method according to the invention according to an exemplary embodiment.

Additionally or alternatively, it may also be provided to partially or completely guide the exhaust gas to be guided via exhaust gas recirculation line 19 via an exhaust gas bypass 30, which bypasses exhaust gas cooler 21, provided that such a bypass is provided, as is the case in the internal combustion engine according to FIG. 2. Exhaust gas cooler 21 may then no be able to effectuate a cooling of the exhaust gas guided via exhaust gas bypass 30. However, the disadvantage thereof may be that a heating of exhaust gas cooler 21 itself is not effectuated with the aid of the heated exhaust gas or only to a reduced extent.

The internal combustion engine according to FIG. 2 corresponds to the one according to FIG. 1 with the exception of this additional exhaust gas bypass 30 as well as further control valves 20, which are provided to guide exhaust gas as needed via exhaust gas recirculation line 19 and/or exhaust gas bypass 30.

Particular exhaust gas aftertreatment apparatus 13 of the internal combustion engines according to FIGS. 1 and 2 may specifically have a design which is described below.

At least one heating device 23 should be preferably arranged in exhaust tract 8 upstream from particle filter 18. It may also be arranged directly upstream from particle filter 18 or directly upstream from SCR catalyst 16 (which may have, for example, a design as an SCR disk), SCR catalyst 16, in turn, being able to be arranged directly upstream from particle filter 18. Particle filter 18 may be preferably designed in such a way that a regeneration by soot burn-off already takes place starting at temperatures >350° C. The cellularity of SCR catalyst 16 may be preferably maximized in comparison to that of particle filter 18 to implement a maximization of the effective surface for the NOx conversion. Due to NOx storage catalyst 15, which is arranged upstream from SCR catalyst 16, SCR catalyst 16 may be provided with a passive design. However, an active design is also possible, using a dosing and mixing section between injection device 17 and SCR catalyst 16.

Due to a heating of exhaust gas aftertreatment apparatus 13 by the at least one heating device 13, a relatively fast reaching of the start of conversion for HC, CO, NOx and particle emissions may be implemented after a cold start of the internal combustion engine.

Exhaust gas aftertreatment apparatuses 13 according to FIGS. 1 and 2 are also advantageous with regard to an on-board diagnosis (OBD) of the internal combustion engine, since two different exhaust gas aftertreatment components are used for the conversion of the HC and CO emissions. Two exhaust gas aftertreatment components and, in the case of the illustrated use of NOx storage catalyst 15, even three thereof, are also available for the NOx conversion. In the case of a fault in one exhaust gas aftertreatment component, the compliance with the particular emission threshold are this ensured.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine, which comprises a combustion unit, a generator coupled with the combustion unit, a fresh gas tract, an exhaust tract, an exhaust gas recirculation line, which branches off of the exhaust tract and opens into the fresh gas tract, and at least one electrical heating device, which is integrated into: a section of the exhaust tract that is upstream of the exhaust gas recirculation line or the exhaust gas recirculation line or the section of the exhaust tract that is upstream of the exhaust gas recirculation line and the exhaust gas recirculation line, the method comprising:

operating the at least one electrical heating device with energy provided by the generator during an overrun mode of the combustion unit; and guiding via the exhaust gas recirculation line, partially or completely, exhaust gas heated with the aid of the at least one electrical heating device.

2. The method according to claim 1, wherein method is performed during a warm-up phase of the internal combustion engine.

3. The method according to claim 1, wherein the at least one electrical heating device is assigned to an exhaust gas aftertreatment apparatus, and the exhaust gas recirculation line branches off of the exhaust tract downstream from the exhaust gas aftertreatment apparatus.

4. The method according to claim 1, wherein an exhaust gas cooler is integrated into the exhaust gas recirculation line, the exhaust gas to be guided via the exhaust gas recirculation line being guided during the overrun mode via an exhaust gas bypass, which bypasses the exhaust gas cooler, and/or wherein a coolant flow through the exhaust gas cooler is reduced or prevented in comparison to an operation of the combustion unit under load.

5. The method according to claim 4, wherein the coolant flow is partially or completely guided via a coolant bypass of a cooling system of the internal combustion engine.

6. The method according to claim 1, wherein the generator is operated at maximum electrical power during the overrun mode of the combustion unit.

7. The method according to claim 1, wherein the at least one electrical heating device is additionally operated with energy originating from an energy storage source.

8. The method according to claim 7, wherein the at least one electrical heating device is additionally operated with energy from the energy storage source only if a setpoint heating power of the at least one electrical heating device is greater than an actual electrical power of the generator.

9. The method according to claim 1, wherein the exhaust gas aftertreatment apparatus and/or a branch of the exhaust gas recirculation line is/are arranged downstream from an exhaust gas turbine integrated into the exhaust tract.

10. The method according to claim 1, wherein the combustion unit is operated in an auto-igniting manner.

11. A method for operating an internal combustion engine, which comprises a combustion unit, a generator coupled with the combustion unit, a fresh gas tract, an exhaust tract, an exhaust gas recirculation line, which branches off of the exhaust tract and opens into the fresh gas tract, and at least one electrical heating device, which is integrated into the exhaust tract and into the exhaust gas recirculation line, the method comprising:

operating the at least one electrical heating device with energy provided by the generator during an overrun mode of the combustion unit; and guiding via the exhaust gas recirculation line, partially or completely, exhaust gas heated with the aid of the at least one electrical heating device.

\* \* \* \* \*